United States Patent Office 3,263,498
Patented August 2, 1966

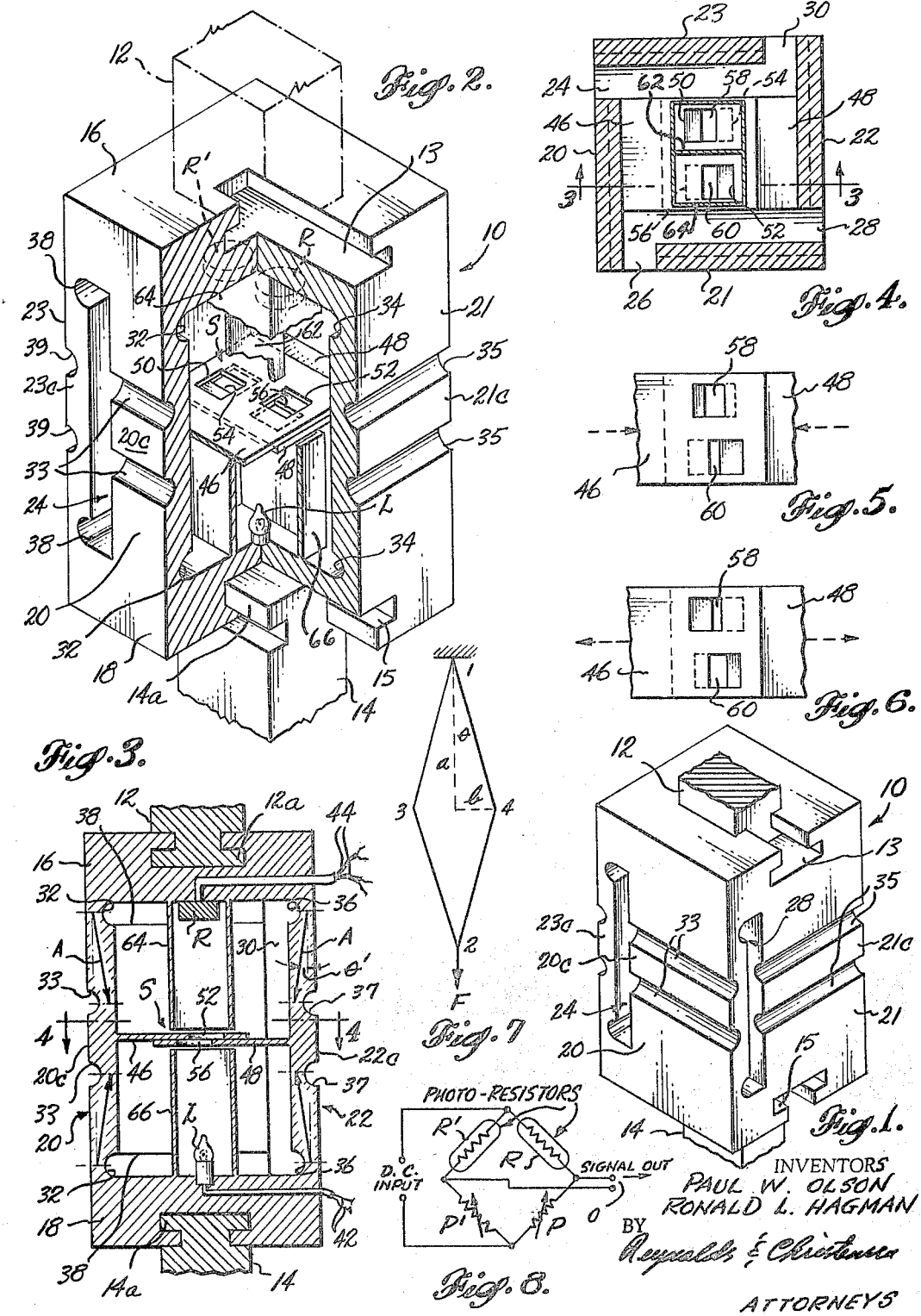

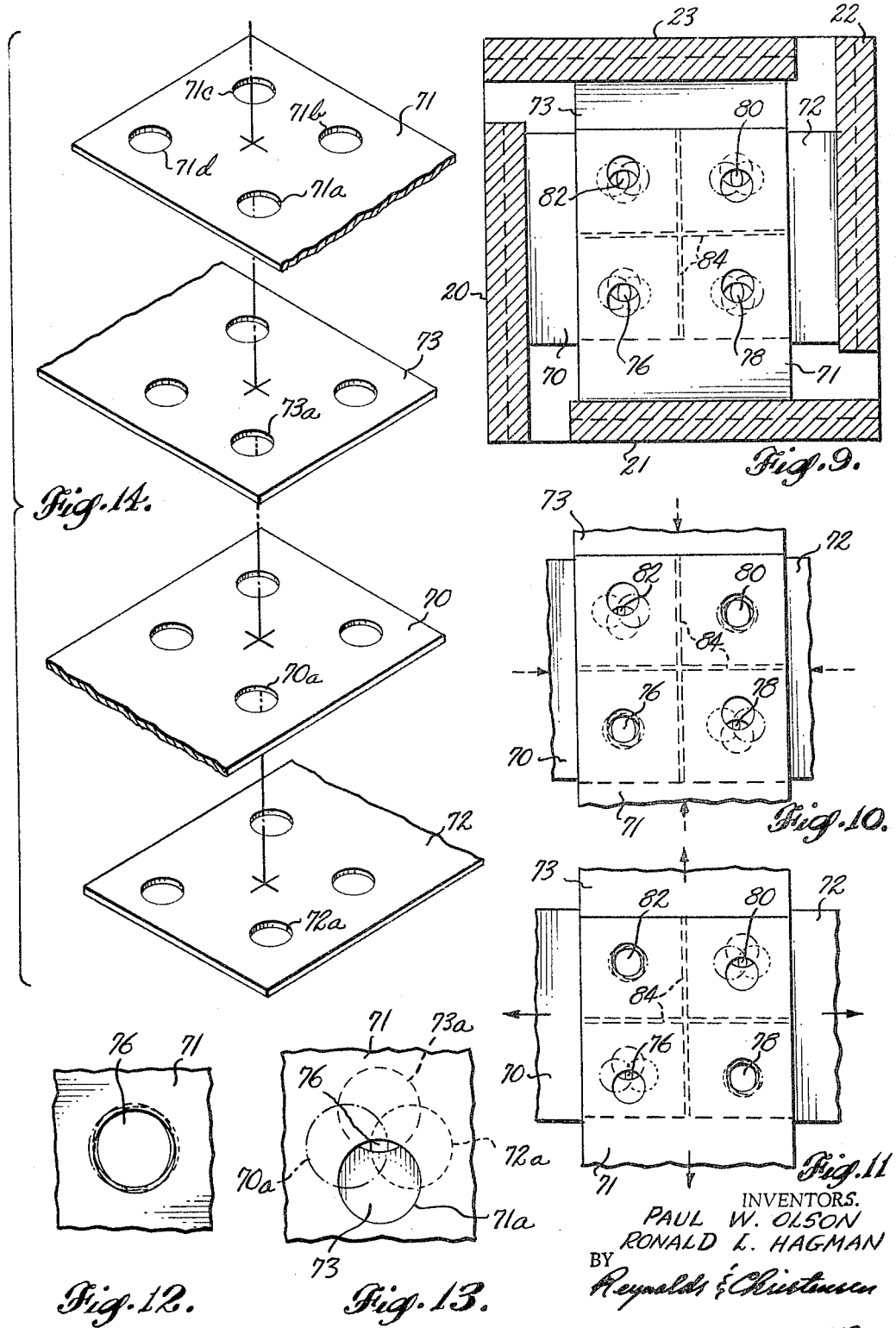

3,263,498
LOAD CELL
Ronald L. Hagman, Renton, and Paul W. Olson, Milton, Wash., assignors to The Boeing Company, Seattle, Wash., a corporation of Delaware
Filed July 6, 1964, Ser. No. 380,215
7 Claims. (Cl. 73—141)

This invention relates to force measuring devices and more particularly concerns a load cell of the type adapted to measure force applied thereto by measuring its own distortion in response to such force. While the invention is described in terms of preferred embodiments thereof, it will be recognized by those skilled in the art that various changes and modifications may be made therein without departing from the principal features involved.

In the past many devices have been used for measuring forces in testing of materials, structures and components, including load rings, stress gauges, and others. Such devices are frequently placed in series with a load applied to a structure being tested to give a continuous indication of the force applied as it is increased, for example, up to the failure point of the structure. In general, such devices include internal means for converting their own distortion to a physical indication or to an electrical quantity which can be used to indicate the amount of force applied.

The instant device provides improvements in that general type of load measuring cell, and is specifically designed for use in measuring axial forces applied thereto in either tension or compression.

Accordingly, this invention provides a load cell comprising end portions to which the force is applied and an intermediate force measuring portion including a pair of longitudinal transversely spaced wall members interconnecting the end portions. The end portions and wall members are preferably of integral one-piece construction. The wall members are thinner in the direction of spacing than laterally of themselves and are adapted to bend or buckle oppositely of one another in response to tensile and compressive forces applied to the end portions. A light source and light-sensitive detector means are located within the device, and a light control mechanism is interposed therebetween. The light control means comprises a pair of overlapping parallel plate members internally of the cell, one attached to each of the wall members whereby opposite flexing of the wall members translates said plate members relatively into greater or lesser degrees of overlap. The plate members include corresponding light-transmitting areas normally disposed in partial light-transmitting registry whereby relative translation of the plate members in response to flexing of the wall members caused by axial force varies the degree of registry and therefore the amount of light transmitted to the detector means. A suitable calibrated force indication means operatively associated with the detector means indicates the amount of force applied.

Preferably, there are at least two light-transmitting areas in each plate member, each area being associated with one in the other plate member to form a pair of shutters, one increasing its light-transmitting registry and the other decreasing its light-transmitting registry in response to an axial force. Separate photosensitive elements are provided for each shutter, and these are connected in a conventional bridge circuit whereby to double the electrical output indication.

In the preferred form of the load cell opposite wall members have central sections which are not distorted by axial force but are moved parallel to each other during bending of in remainder of the wall member. Thus each wall member comprises a central section to which the associated plate member is attached, and end sections having outer terminal portions connected to the respective end portions of the cell and inner terminal portions connected to the central portion. The outer terminal portions are offset transversely of the cell with respect to the inner terminal portions whereby axial force is transmitted through said end sections at an angle to the axis of the cell. The degree of offset is the same for end sections of opposite wall members, whereby the central sections thereof remain parallel and deflect equally during flexing of the wall members.

Preferably the load cell comprises a box-like structure including two pairs of longitudinal parallel wall members arranged symmetrically about the longitudinal axis of the cell. The wall members preferably are identical, each having one edge lying along one edge of the box-like cell itself and having its other edge separated from the adjacent wall member by a longitudinal slot.

In one such embodiment the load cell includes two pairs of plate members, one attached to each of the four wall members and all overlapping and adapted to be translated relatively in response to an axial force. The light control means is then adapted to utilize the total resultant relative movement of all of the plate members as a measure of the force. This is achieved by including in each plate member four light-transmitting areas, each corresponding to a similar area in each of the other plates. The corresponding light-transmitting areas of the four plates are normally positioned in partial registry and form four separate shutter means. In fact, they are arranged in two pairs, the areas in one pair increasing and in the other pair decreasing their light-transmitting registry in response to an axial force causing translative movement of the plate members. Separate photosensitive means are included for the separate shutter means and are connected in a suitable bridge circuit whereby the maximum benefit is obtained from the resultant relative movement of all four wall members to achieve maximum sensitivity. Alternatively, corresponding photosensitive elements from each pair can be connected in separate indicator circuits for obtaining measurements in different ranges at different sensitivities.

These and other features, objects and advantages of the invention will become apparent from the following more detailed description of the invention, taken in connection with the accompanying drawings.

FIGURE 1 is a perspective view of the load cell of this invention, showing sectional parts of means for applying an axial force thereto.

FIGURE 2 is a perspective view of the load cell with portions thereof cut away to reveal internal details, and showing fragmentally and in outline form means for applying an axial force.

FIGURE 3 is a sectional view of the load cell and means for applying force thereto, taken in the longitudinal plane 3—3 indicated in FIGURE 4.

FIGURE 4 is a sectional view of the load cell, taken in the transverse plane 4—4 indicated in FIGURE 3.

FIGURE 5 is a fragmental top view of the plate members shown in FIGURE 4 in the position they would take in response to a compressive force on the load cell.

FIGURE 6 is a fragmental top view of the same plate members in the position they would take in response to a tensile force applied to the load cell.

FIGURE 7 is a force diagram illustrating the principle by which a mechanical advantage is obtained in the configuration of the wall members as shown in cross section in FIGURE 3.

FIGURE 8 is a diagram of part of the indicator circuit used with the invention.

FIGURE 9 is a transverse sectional view, similar to that of FIGURE 4, of a second embodiment of the invention having a different form of shutter means in the illustrated plate members.

FIGURE 10 is a fragmental top view of the shutter means of FIGURE 9 in the position they would take in response to a compressive force applied to the load cell.

FIGURE 11 is a fragmental view of the shutter means of FIGURE 9 in the position they would take in response to a tensile force applied to the load cell.

FIGURES 12 and 13 are fragmental views of one of the light-transmitting areas of the shutter means of FIGURE 9, illustrating near-maximum and near-minimum light-transmitting positions, respectively.

FIGURE 14 is an exploded fragmental view of the plate members of the shutter means in FIGURE 9.

The load cell 10 is a box-like structure preferably of a metal alloy, such as berrilium copper, and having end portions 16 and 18 to which axial force may be applied. Force is applied in the illustrated case through elements 12 and 14 securable to the load cell by means such as the T-shaped keyways 13 and 15 in the end portions of the cell and the matching T-shaped keys 12a and 14a of the force-applying elements.

Interconnecting end portions 16 and 18 are four essentially identical longitudinal parallel wall members 20, 21, 22 and 23, each having one edge positioned as an edge of the load cell itself, and having its other edge separated from the adjacent wall member by one of the longitudinal slots 24, 26, 28, and 30. Thus there is symmetry as to the basic structure of the load cell about a longitudinal central axis (not indicated) along which force is applied through loading elements 12 and 14. This distribution of the wall members is an important feature from a manufacturing standpoint, since it permits internal features of the cell body to be machined in fewer steps than would otherwise be possible. In addition, the symmetrical construction results in greater stability because of the symmetry of distortion and because the extreme corners of the end portions are interconnected and supported by the full cross section of a wall member.

The wall members are constructed to utilize the rhombic deflection principle illustrated in FIGURE 7. In some prior devices using this principle load cell members have been arranged in the form of a rhombus, such as in FIGURE 7, having a long major diagonal between corners 1 and 2 and a short minor diagonal between corners 3 and 4, so that the angle $\theta$ between the diagonal 1–2 and member 1–4 is small. For small values of $\theta$ the tangent function (tan $\theta = b/a$) is very linear, so that measurement of distortion of the rhombus in response to the force applied at points 1 and 2 is an accurate proportional measurement of that force. The amplification factor attained is equal to the ratio $a/b$, or cotangent $\theta$, which becomes larger as $\theta$ is made smaller.

In the instant load cell the wall members are not arranged in rhombic form, but for greater stability are separated as far as possible transversely of the cell, yet are constructed so that the lines of force transmitted through the wall members take paths forming slight angles $\theta'$ with the direction of axial force, as illustrated in FIGURE 3. To achieve this effect, pairs of parallel lateral grooves 32, 34, 36 and 38 are cut across the inner faces of wall members 20, 21, 22 and 23 at their ends where they are joined to end portions 16 and 18 of the load cell. Similar pairs of parallel lateral grooves 33, 35, 37 and 39 are cut across the outer faces of the wall members at about their longitudinal center, thus dividing each wall member into an intermediate section and two end sections. The cross section of each wall member is reduced in size and its center of inertia shifted by each of these grooves, so that an axial force applied to the load cell is transmitted through the end sections of the wall members along the paths shown by arrows A, each forming an angle $\theta'$ with the length of the wall member. The size of angle $\theta'$, and therefore the mechanical advantage gained by the load cell, and also the stiffness and frequency response of the wall members, depends upon the depth of the grooves in the inner and outer faces of the wall member. Thus the invention is conveniently adaptable to constructions for various load ranges and sensitivities.

It will be seen that while in the illustrated embodiment the wall members act in reverse of the rhombus, deflecting inwardly in response to compressive force and outwardly in response to tensile force, the deflection can be made to occur in the opposite direction by constructing the grooves in the opposite surfaces. The grooves are made identical so that all the wall members flex equally.

Another important feature of the invention is that central sections 20C, 21C, 22C and 23C between the respective pairs of parallel lateral grooves 33, 35, 37 and 39 always deflect parallel to themselves in response to axial forces. This parallel movement is utilized in the force measuring mechanism internally of the cell as now to be described.

Within the chamber enclosed by the four wall members are a lamp L energizable by a voltage source (not shown) connected to electrical terminals 42, a pair of photosensitive resistors R and R' connected to a detector circuit later described by electrical terminals 44, and shutter means S to be described controlling the amount of light from lamp L reaching the photo-resistors R and R'.

In the embodiment shown in FIGURES 2 and 6 the shutter means S comprises a pair of plate members 46 and 48 each secured to one of the central portions 20C and 22C of wall members 20 and 22, respectively, and extending parallel to and toward each other into overlapping relationship centrally of the chamber as shown. In response to axial forces applied to the cell causing inward or outward parallel movement of the central portions of the wall members the plate members move translatively with respect to one another into varying degrees of overlap. Upper plate member 46 includes two generally square apertures 50 and 52 spaced apart in one direction transversely of the cell and offset from each other in a perpendicular transverse direction. Lower plate member 48 includes similarly spaced but oppositely offset generally square apertures 54 and 56 each normally in partial registry with openings 50 and 52 in the upper plate members. Thus apertures 50 and 54 are in partial registry having common light-transmitting area 58, while apertures 52 and 56 are in partial registry having common light-transmitting area 60. Since offset of one set of apertures is opposite of that of the other set of apertures, a compressive force causes light-transmitting area 58 to be enlarged and area 60 to be reduced in size, as shown in FIGURE 5. Conversely, a tensile force causes light-transmitting area 58 to be reduced in size and area 60 to be enlarged, as shown in FIGURE 6. Thus compressive forces increase the amount of light falling on photoresistor R' and decrease the amount falling on photo-resistor R, while the reverse is true for tensile forces.

The photo-resistors are connected in adjacent arms of the conventional bridge circuit shown in FIGURE 8 forming part of a suitable detector circuit. The bridge circuit is energized by a D.C. source (not shown) and includes variable resistors P and P' in adjacent arms opposite the photo-resistors permitting zero-adjustment of the load cell force indication obtained at the output 0, which may be connected to any suitable indicator (not shown) calibrated to indicate the axial force applied to the cell. By virtue of the dual shutter arrangement increasing and decreasing the light reaching the respective photo-resistors, and their connection in the bridge circuit, the output signal is doubled and drift effects due to fluctuation in the power supply for either the lamp L or the bridge circuit itself are cancelled out so as not to affect the force indication.

In order to keep the light passing through the respective shutter openings 58 and 60 from intermixing or mixing with light entering the cell chamber through the longitudinal slots 24, 26, 28 and 30 before reaching the photo-resistors, a dividing shield 62 (shown partially cut away in FIGURE 2) is provided extending downwardly from a point between the photo-resistors nearly to the upper plate member 46, and enclosing shield 64 is provided completely surrounding the photo-resistors in the region of the shutter openings in the upper plate member. A lower shield 66 is similarly provided to surround the lamp L below the lower plate member 48. It is secured to the lower end portion 18 of the cell and extends longitudinally thereof nearly to the lower plate member plate 48.

In the second embodiment of the invention shown in FIGURES 9 to 14 the outer structure of the cell body is identical to that previously described, including wall members 20, 21, 22 and 23 shown enlarged in FIGURE 9. In this case four plate members 70, 71, 72 and 73 are secured to the central portions of the wall members, in a manner similar to those previously described, and extend into mutually overlapping relationship centrally of the cell as before. In each plate member are four circular apertures, for example 71a, 71b, 71c and 71d in the upper plate member 71, corresponding apertures in the respective plates overlapping to have common light-transmitting areas 76, 78, 80 and 82. Corresponding apertures in opposing plate members are aligned in the direction of their translative movement, but are offset as shown so that diagonally opposite openings (areas) 76 and 80 are enlarged and openings 78 and 82 are constricted in response to a compressive force as shown in FIGURE 10. The reverse effect occurs in response to tensile force causing the plate members to overlap to a lesser degree, as shown in FIGURE 11.

The resultant increase and decrease in light-transmitting area 76 is shown in enlarged form in FIGURES 12 and 13, respectively, wherein the respective plate apertures 70a, 71a, 72a and 73a are indicated by different forms of outlining. FIGURE 12 shows the effect of a nearly maximum compressive force, while FIGURE 13 shows the effect of a nearly maximum tensile force.

In this embodiment as well as that first described it is preferable to provide a single lamp L (FIGURE 3) so that the effect of any fluctuations in the amount of light emitted by the lamp is the same for all the photo-resistors. Four photo-resistors (not shown) are provided corresponding to the four openings 76, 78, 80 and 82. As in the first embodiment intermixture of light transmitted through the four separate shutters is prevented by suitable shield means secured as before to the end portion of the load cell in positions indicated by dotted lines 84 and dividing the space above the upper plate member 71 into quadrants within which are located the separate photo-resistors.

The respective photo-resistors for this embodiment can also be connected in a bridge circuit, with the pair of photo-resistors for diagonally opposite openings 76 and 80 connected in one arm of the bridge circuit and the other pair for openings 78 and 82 connected in an adjacent arm whereby the drift cancellation effect is utilized. Alternatively, photosensitive elements from each pair can be connected in separate indicator circuits for obtaining measurements in different ranges and at different sensitivities.

The four-plate shutter means in this embodiment takes full advantage of the total resultant relative movement of wall members 20, 21, 22 and 23 in an extremely simple and reliable manner. The result is a stable and accurate load cell giving maximum reading for minimum of distortion, giving good repeatability of measurements, and which is easily adaptable to construction for a wide range of load, frequency of response, and sensitivity requirements. Other advantages will be recognized by those skilled in the art.

We claim as our invention:

1. A load cell of the type adapted to measure force applied thereto by measuring its own distortion in response to such force comprising end portions to which an axial force may be applied and an intermediate force measuring portion including a pair of longitudinal transversely spaced wall members interconnecting said end portions, all of integral one-piece construction, said wall members being materially thinner in the direction of their transverse spacing than laterally of themselves and adapted to flex oppositely of one another in response to said axial force, a light source and light-sensitive detector means located within said device, light control means interposed between the light source and the detector means and including a pair of transversely overlapping parallel plate members, one attached to each of said wall members whereby opposite flexing of the wall members translates said plate members relatively, said plate members having corresponding light-transmitting areas normally disposed in partial light-transmitting registry whereby relative translation of the plate member varies said registry to control the amount of light transmitted to said detector means, and calibrated force indication means operatively associated with said detector means.

2. The load cell defined in claim 1 wherein said cell comprises two such pairs of wall members arranged symmetrically about a longitudinal axis thereof, the respective plate members associated therewith overlapping mutually, and corresponding light-transmitting areas of one opposing pair of plate members being normally disposed also in partial registry with those of the other opposing pair, whereby relative translation of the plate members varies said registry in four directions transversely of said axis.

3. The load cell defined in claim 1 wherein each wall member comprises a central section to which the associated plate member is attached, and end sections having outer terminal portions connected to respective end portions of said cell and inner terminal portions connected to said central section, said outer terminal portions being offset transversely of the cell with respect to said inner terminal portions whereby axial force is transmitted through said end sections at an angle to the axis of the cell, the degree of such offset being the same for end sections of opposite wall members, whereby the central sections thereof remain parallel and deflect equally during flexing of said wall members.

4. The load cell defined in claim 3 wherein said wall members comprise normally parallel wall members of substantially identical rectangular cross sections having inner and outer transversely facing surfaces, each wall member further having in one of said surfaces lateral grooves adjacent the end portions of said cell and forming the outer terminal portions of said end sections, and in the other of said surfaces lateral grooves spaced oppositely from the point of attachment of said associated plate member and forming the inner terminal portions of said end sections.

5. The load cell defined in claim 4 wherein said cell comprises a box-like structure including two such pairs of wall members arranged substantially symmetrically about a longitudinal axis thereof, each wall member being offset laterally of itself with respect to the opposing wall member whereby one edge thereof is positioned along one edge of said box-like structure, and having its other edge separated from the adjacent wall member by a longitudinal slot extending between the end portions of said cell.

6. The load cell defined in claim 5, wherein each plate member includes at least one pair of light-transmitting member areas, one set of corresponding areas in each opposing pair of plate members being offset oppositely of offset of the other set of corresponding areas in the same pair of plate members whereby registry of one set increases and the other decreases during relative translation of said plate members.

7. The load cell defined in claim 1 wherein each plate member includes a pair of light-transmitting areas, one set of corresponding areas being offset oppositely of offset of the other set of corresponding areas whereby registry of one set increases and the other decreases during relative translation of said plate members, said detector means including separate light-sensitive elements each positioned to have light received thereby controlled by registry of one of the sets of corresponding light-transmitting areas, and said calibrated force indication means comprising a circuit including said elements and responsive to changes in the relative light intensity on said elements.

References Cited by the Examiner

UNITED STATES PATENTS

| | | | |
|---|---|---|---|
| 2,301,396 | 11/1942 | Graf | 73—382 |
| 3,073,155 | 1/1963 | Ianuzzi | 73—141 |
| 3,205,365 | 9/1965 | Jones | 338—15 X |

FOREIGN PATENTS 882,314  7/1953  Germany.

RICHARD C. QUEISSER, *Primary Examiner.*